United States Patent [19]

Brede, III et al.

[11] 3,807,913
[45] Apr. 30, 1974

[54] APPARATUS FOR MAKING A BRAKE DRUM RING COMPACT

[75] Inventors: Alexander Brede, III, East Lansing; Charles E. Schalla, Grand Ledge, both of Mich.; Frank R. Tully, Cuyahoga Falls, Ohio

[73] Assignee: Motor Wheel Corporation, Lansing, Mich.

[22] Filed: May 19, 1972

[21] Appl. No.: 255,230

[52] U.S. Cl............... 425/78, 425/354, 425/422, 425/443
[51] Int. Cl................................................ B22f 3/02
[58] Field of Search........ 425/78, DIG. 35, DIG. 42, 425/354, 355, 422, 444, 443; 188/218; 29/149.5 PM

[56] References Cited
UNITED STATES PATENTS

| 3,500,972 | 3/1970 | Talmage | 29/420 X |
| R25,441 | 9/1963 | Eyberger | 425/78 X |
| 2,253,003 | 8/1941 | Whipple | 425/78 X |
| 1,679,408 | 8/1928 | Davis et al. | 18/DIG. 35 |
| 2,274,503 | 2/1942 | Reid | 188/218 R |
| 1,286,089 | 11/1918 | Pfanstiehl | 425/78 X |
| 3,694,127 | 9/1972 | Takahashi et al. | 425/78 X |

Primary Examiner—J. Spencer Overholser
Assistant Examiner—John E. Roethel
Attorney, Agent, or Firm—Barnes, Kisselle, Raisch & Choate

[57] ABSTRACT

A brake drum with a sintered metal drum ring fixed to a sheet metal backing plate. The drum ring has a cylindrical inner peripheral brake track surface and an outer peripheral surface of generally frustoconical shape with a plurality of circumferentially spaced generally axially and radially inwardly extending grooves therein forming cooling fins in the outer peripheral surface of the drum ring. The drum ring is formed by sintering a drum ring compact of powdered metal. The compact is made in a compacting apparatus having a generally circular mold cavity with a cylindrical inner wall and a generally frustoconical outer wall inclined so that it diverges from the inner wall in the direction in which the compact is ejected from the mold cavity. During ejection as the compact is initially displaced in the mold cavity, its outer peripheral surface disengages from the outer wall. This allows the compact to diametrically expand uniformly along its entire axial length to thereby also release its inner peripheral surface from the inner wall of the mold cavity and thus relieve frictional drag and uneven stress on the compact early in the ejection cycle.

9 Claims, 11 Drawing Figures

APPARATUS FOR MAKING A BRAKE DRUM RING COMPACT

This invention relates to a vehicle brake drum and more particularly to a sintered metal brake drum and a method and apparatus for making the same.

A brake drum with a sintered metal drum ring fixed to a sheet metal backing plate is shown in Talmage U.S. Pat. No. 3,500,972. The drum ring is made by sintering a powdered metal drum ring compact after the same has been formed in a compacting press having a punch ring and an ejector sleeve adapted to be moved axially toward each other into opposite ends of the mold cavity of the press. This mold cavity has parallel concentric inner and outer cylindrical side walls (disregarding any slight draft angle thereon which may be about one-half degree) which slidably receive the punch ring and ejector sleeve therebetween with a close fit to provide a seal which prevents escape from the mold cavity of powdered metal while it is being compacted therein. A plurality of core pins extend axially of the cavity to produce a drum ring having a multiplicity of axially extending holes therethrough spaced circumferentially around the drum ring. The core pins also have a very slight taper oppositely inclined to the cavity wall taper and are retracted in a direction opposite to the ejection direction of the compact, and thus assist in releasing the compact from the mold cavity by providing an expansion volume internally of the compact. However, when such core pins are omitted to make a solid section drum ring, difficulty has been experienced with this parallel side wall mold cavity in ejecting the drum ring compact without scarring the side walls thereof and producing cracks and discontinuities therein when the axial width of the drum ring compact is greater than about 1 inch. In addition, as the peripheral surface area of the inner and outer side walls of the compact increases the amount of force required to eject the compact from a parallel side wall mold cavity also increases. Thus, when forming larger compacts having increased axial and/or diametrical dimensions, it becomes increasingly more difficult to provide an ejector mechanism capable of developing sufficient force within the limited confines of the parallel side wall mold cavity to eject the compact therefrom. The problem is further complicated when it is desired to compact a drum ring having cooling fins or ribs on the outer peripheral surface thereof because of difficulty in ejecting such a compact from a parallel side wall mold cavity without scarring the surface of the ribs and producing cracks and discontinuities therein.

Accordingly, objects of the present invention are to provide an improved method and apparatus for forming a brake drum ring compact which is substantially without scarring cracks and discontinuities therein, and hence, produces a highly satisfactory brake drum ring, produces fewer unsatisfactory drum rings than prior methods and apparatus, and thus, results in economical manufacture of brake drum rings and substantially decreases the force required to eject a brake drum compact from a mold cavity compared to prior art parallel side wall mold cavities.

Another object is to provide an improved brake drum having a sintered powdered metal drum ring of improved frustoconical contour for optimizing its strength to weight ratio and which has a multiplicity of very narrow fins in the outer periphery thereof to greatly increase the cooling surface area of the drum, and which is economical to manufacture and assemble.

These and other objects, features and advantages of this invention will become apparent from the following description, appended claims and accompanying drawings in which:

Figures 8, 9, 10, 11:
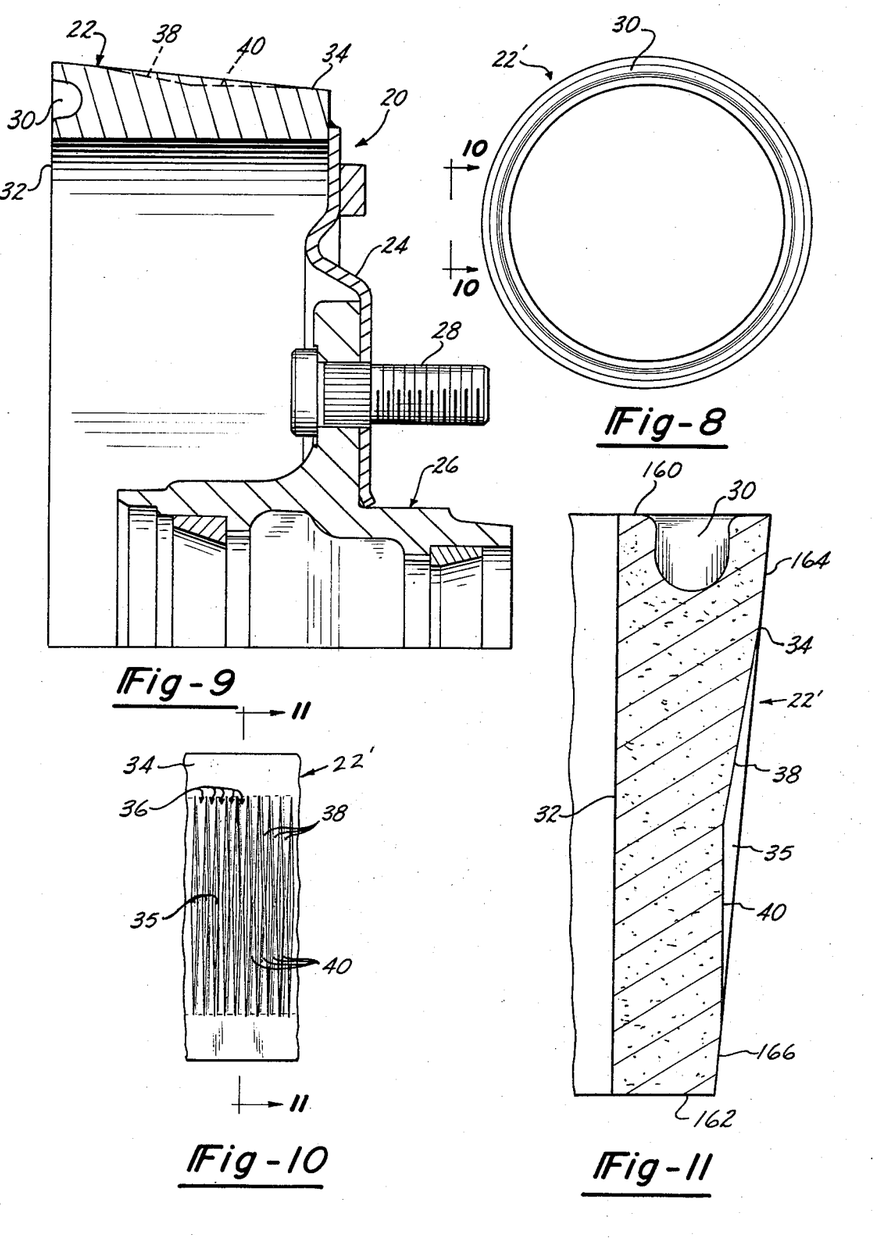
FIG. 8 is a plan view looking at the dust groove end of a powdered metal brake drum ring compact of this invention produced by the method and apparatus of FIGS. 1 through 7.
FIG. 9 is a fragmentary vertical section of a brake drum of this invention mounted on a wheel hub and incorporating the powdered metal drum ring compact of FIG. 8 after the same has been sintered and welded to a drum back.
FIG. 10 is a fragmentary elevational view looking in the direction of arrows X—X of FIG. 8 illustrating the cooling fins on the outer periphery of the powdered metal brake drum ring compact.
FIG. 11 is a vertical section on line XI—XI of FIG. 10.

Referring in more detail to the accompanying drawings, one preferred form of a brake drum 20 of this invention is illustrated in FIG. 9 which comprises a sintered metal drum ring 22 fixed at its rear edge as by a circumferentially continuous arc weld to a stamped sheet metal (preferably steel) backing plate 24 which serves as the drum back. Drum 20 may be mounted on a conventional wheel hub 26 which in turn is adapted to be mounted on a wheel spindle, the backing plate 24 being secured to the mounting flange of hub 26 by five mounting bolts 28 press fit into mating holes in the hub flange and backing plate 24. Drum ring 22 has a circumferentially continuous groove 30 in its outer free end to receive the outer edge of a dust seal plate of a conventional brake assembly (not shown). Drum ring 22 has a cylindrical inner peripheral wall 32 which extends substantially parallel to the axis of rotation of hub 26 and serves as the brake track of the drum, and an outer generally frustoconical surface 34 which is tapered or inclined with respect to surface 32 so as to diverge therefrom toward the free end of the drum.

Drum ring 22 is made by compacting metal powder into a drum ring compact or briquette 22' (FIGS. 8, 10, 11) having the same form as drum ring 22 and then sintering compact 22'. Compact 22' and thus sintered drum ring 22 has a plurality of generally axially and radially extending, circumferentially spaced cooling fins 35 formed in the outer periphery thereof for dissipating the heat produced in drum ring 22 when it is used to brake a vehicle (not shown) on which it is mounted. Cooling fins 35 are formed by circumferentially spaced generally axially extending grooves 36 with bottom surfaces 38 and 40 which are both inclined with respect to inner peripheral surface 32. An illustrative powder mix for forming drum ring compact 22' comprises the following proportions by weight:

|  | Parts |
| --- | --- |
| Iron Powder | 96 |
| Copper Powder (copper content can be varied) | 3 |
| Graphite | 1 |
| Stearate or other suitable lubricant | 1 |

These ingredients in powder form are mechanically intermixed.

In the method of this invention, the powder mix is compacted in a mold cavity preferably having no draft whatsoever on the mold cavity wall forming inner peripheral surface 32 so that this surface will be parallel to the axis of rotation of a brake drum 20 in which compact 22' is used after sintering. The outer wall 142 of the mold cavity, described in more detail hereinafter, has a straight taper or inclination at least in that portion of the outer mold cavity wall against which the outer peripheral surface of compact 22' is formed. This tapered portion of the outer mold cavity wall slopes away from the inner surface 32 in the direction in which the compact is ejected from the mold cavity to thereby decrease the force required to eject the compact and also to reduce or eliminate the tendency for the compact to be scarred and develop cracks and discontinuities as it is ejected. Similarly, the core portions of the mold cavity forming the grooves 36 in compact 22' have their generally radially innermost surfaces sloping away from the surface 32 in the direction in which compact 22' is ejected from the mold cavity to facilitate ejection and preclude scarring of and cracks and discontinuities in the cooling fins 35 formed thereby. Fins 35 are not made substantially deeper than is reasonably necessary to create adequate turbulence in the air surrounding the brake drum to cool the brake drum when it is used on a vehicle. Within this parameter, the depth of cooling fins 35 and also their thickness is minimized to decrease variations in the density of the powdered metal throughout compact 22'. Minimizing the thickness of the fins also increases the number of fins which can be formed on the outer periphery of compact 22' and hence, increases the total surface area of the fins, and thus, the cooling capacity of the resulting brake drum ring 22.

Figure 1:
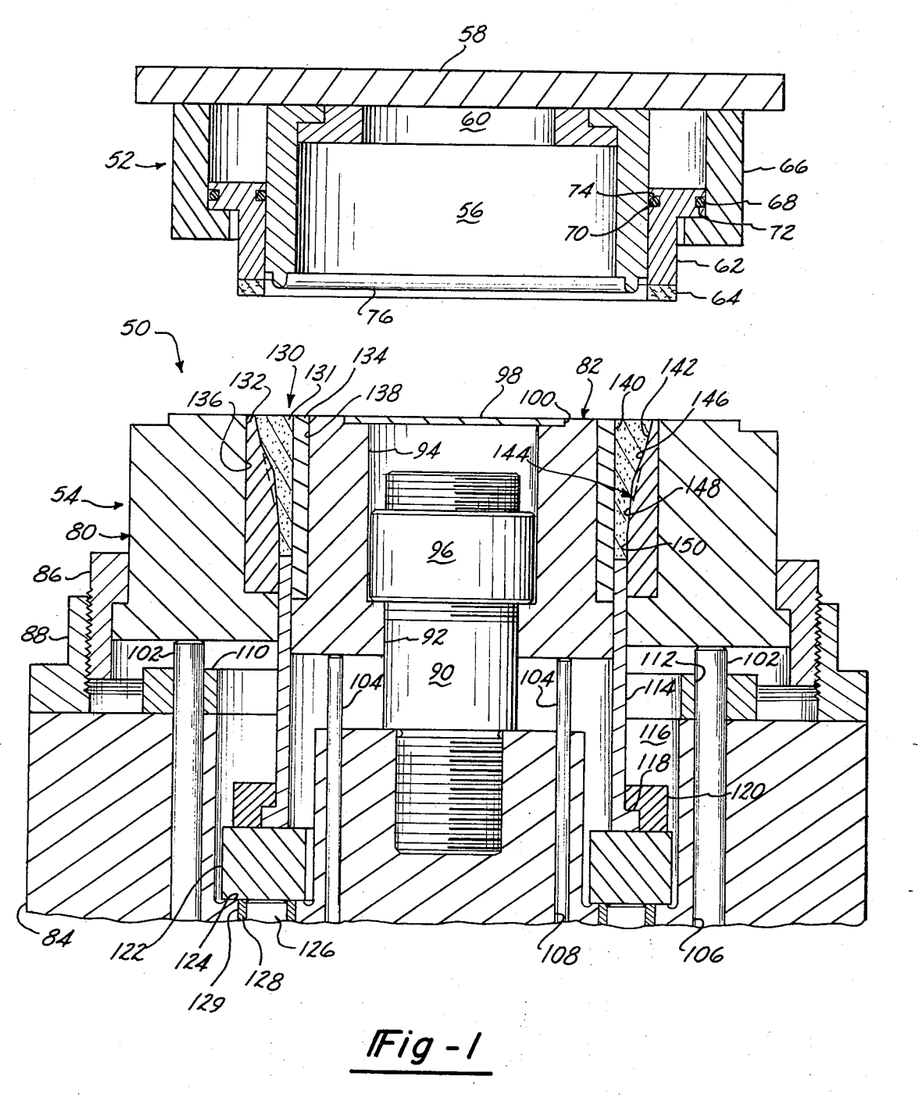
FIG. 1 is a vertical sectional view taken along the axis of an exemplary but preferred compacting apparatus of this invention with the upper and lower dies thereof illustrated in the open position.
Figure 2:
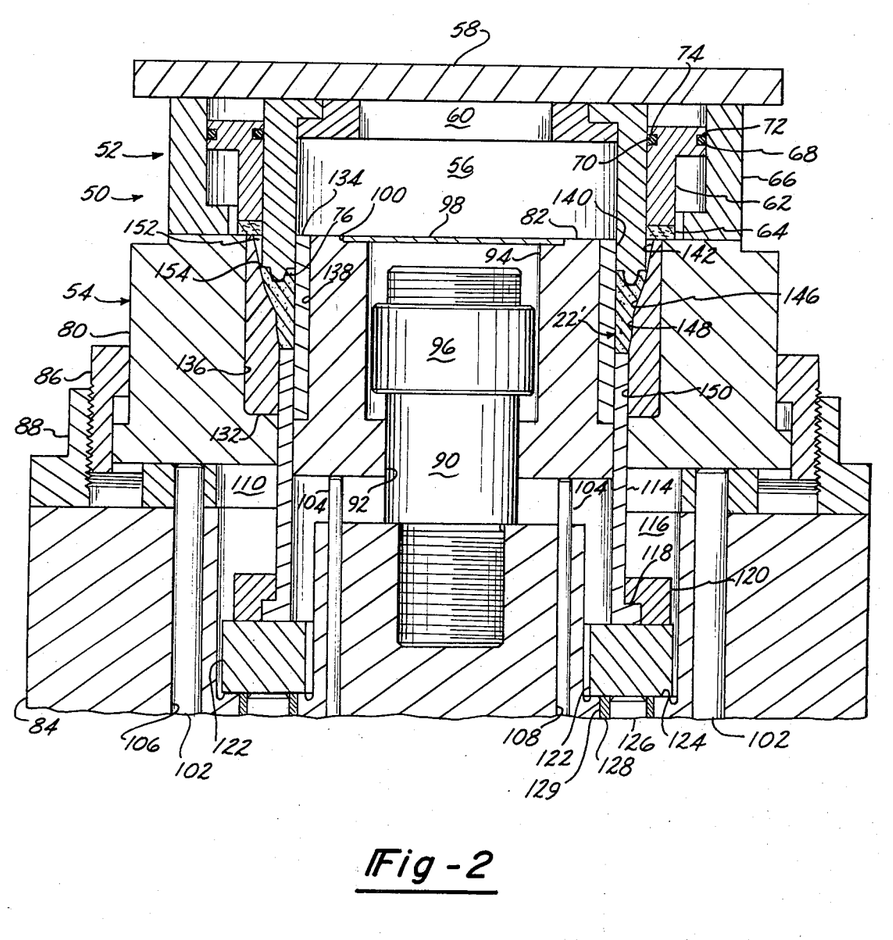
FIG. 2 is a vertical sectional view generally similar to FIG. 1 with the upper and lower dies illustrated in closed position.
Figure 3:
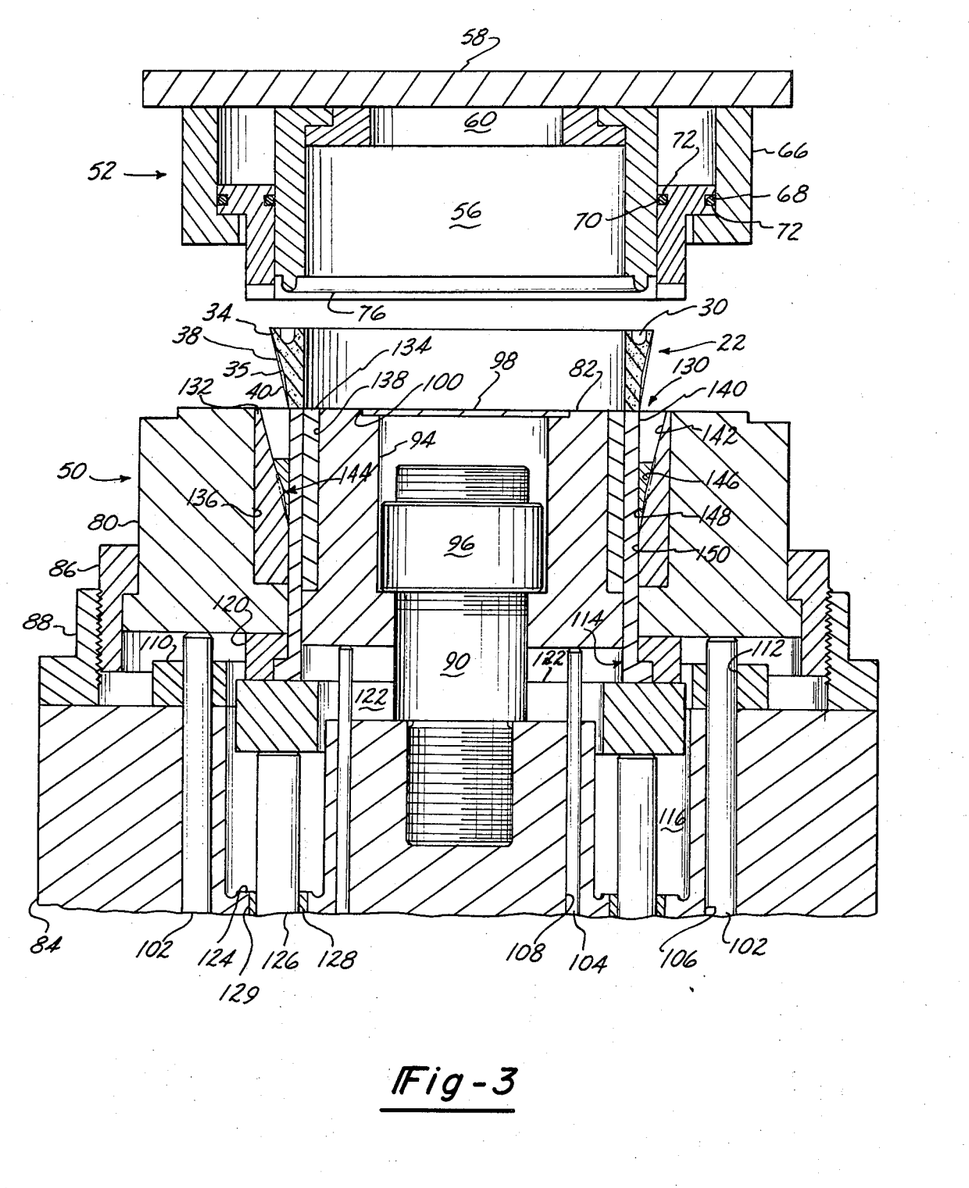
FIG. 3 is a vertical sectional view generally similar to FIGS. 1 and 2 with the upper and lower dies illustrated in the open position with a brake drum ring compact formed therein shown in its fully ejected position.

Preferred compacting apparatus 50 provided pursuant to the present invention for performing the method of forming compact 22' is illustrated in FIGS. 1–3. Compacting apparatus 50 has an upper die 52 and a lower die 54 oriented in a suitable press (not shown) in generally coaxially opposed relation and adapted to be opened and closed by the press. Upper die 52 has a punch ring 56 fixedly mounted on a carrier plate 58 by a retaining collar 60 secured to plate 58 by cap screws (not shown). A seal carrier sleeve 62, with a sealing ring 64 of a material such as felt fixed to its lower end, is slidably received and retained on punch 56 by a retaining ring 66 fixed to carrier plate 58 by cap screws (not shown). A seal is provided between retaining ring 62, punch ring 56 and seal carrier sleeve 62 by O-rings 68 and 70 received in grooves 72 and 74 in sleeve 62. Punch ring 56 has a continuous circular rib 76 with a generally U-shape cross section depending from its lower edge which is adapted to form groove 30 in drum ring compact 22'.

Lower die 54 has outer and inner carrier rings 80 and 82 movably mounted on a base plate 84. Ring 80 is slidably received in a retainer ring 86 threadily received in a collar 88 secured to base plate 84 by cap screws (not shown). Ring 80 is threadily received in collar 88 to facilitate adjustment of the axial spacing of ring 80 from base plate 84. Ring 82 is concentrically concentrically within ring 80 and is slidably mounted on a guide shaft 90. One end of guide shaft 90 is threadily received in base plate 84 and the other end extends through a bore 92 and into a counterbore 94 in ring 82. A stop nut 96 is received in counterbore 94 and threaded on the other end of guide shaft 90 to provide an adjustable stop limiting axial displacement of ring 82 away from base plate 84. A sheet metal disc 98 is received in a counterbore 100 in the upper face of ring 82 to provide a cover for counterbore 94 and nut 96. Carrier rings 80 and 82 are yieldably urged axially upward by support pins 102 and 104 respectively which slidably extend through bores 106 and 108 respectively in base plate 84. Pins 102 and 104 are urged upwardly into engagement with their respective carrier rings 80 and 82 by yieldable biasing means such as compression springs (not shown) received in pockets in the lower face of base plate 84. When outer ring 80 is urged axially downward, it comes to rest on a seat ring 110 which is secured to plate 84 by cap screws (not shown). Seat ring 110 has a plurality of circumferentially spaced holes 112 therein through which pins 102 slidably extend. To remove a brake drum compact 22' from lower die 54, an ejector sleeve 114 is slidably received with a close fit between rings 80 and 82. Sleeve 114 extends into a ring shaped pocket 116 in plate 84 and has a shoulder 118 engaging a retaining ring 120 secured to a seat ring 122. When ejector sleeve 114 is fully retracted, seat ring 122 bears on a bottom wall 124 of pocket 116. Sleeve 114 is shifted axially upwardly by extending ejector pins 126 which bear at their upper ends on seat ring 122 and which are slidably received in wear bushings 128 press fit into bores 129 in base plate 84.

A generally ring-like mold cavity 130, in which powdered metal 131 is compressed to form a drum ring compact 22', is provided in lower die 54 by the cooperation of outer and inner cavity inserts 132 and 134 and ejector sleeve 114. Insert 132 is shrunk fit into a counterbore 136 in ring 80 for axial movement therewith and insert 134 is likewise shrunk fit over a recess 138 in the outer face or ring 82 for movement therewith. Insert 134 has an outer cylindrical surface 140 which extends axially the entire width of mold cavity 130. Surface 140 molds or shapes the brake track surface 32 of a drum ring 22' as it is compacted in mold cavity 130. Insert 132 has on its inner face a surface 142 inclined with respect to surface 140 of insert 134. Surface 142 has a straight taper which slopes away from surface 140 in the direction in which a compact 22' is ejected from mold cavity 130. Surface 142 extends across the entire generally axial width of that portion of mold cavity 130 in which compact 22' is formed when upper and lower dies 52 and 54 are fully closed (as shown in FIGS. 2 and 4), the generally frustoconical outer peripheral surface 34 of compact 22', thus being shaped or molded by surface 142.

Figure 4:
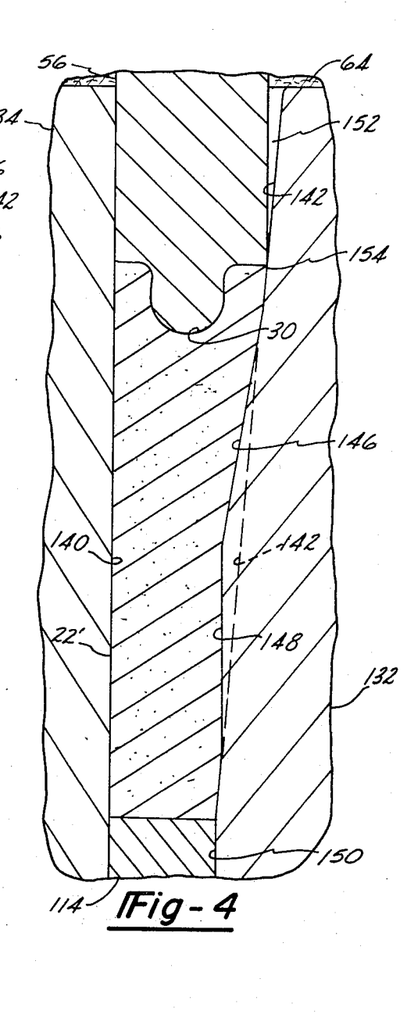
FIGS. 4, 5 and 6 are enlarged fragmentary vertical sectional views of the mold cavity of the compacting apparatus with a brake drum ring compact formed therein illustrated in its respective positions with the dies closed (FIG. 4), opened (FIG. 5) and then with the compact partially ejected (FIG. 6).
Figure 5:
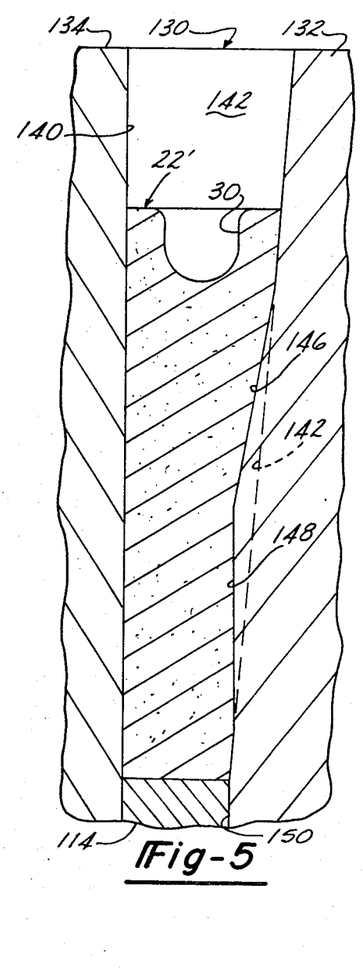
Figure 6:
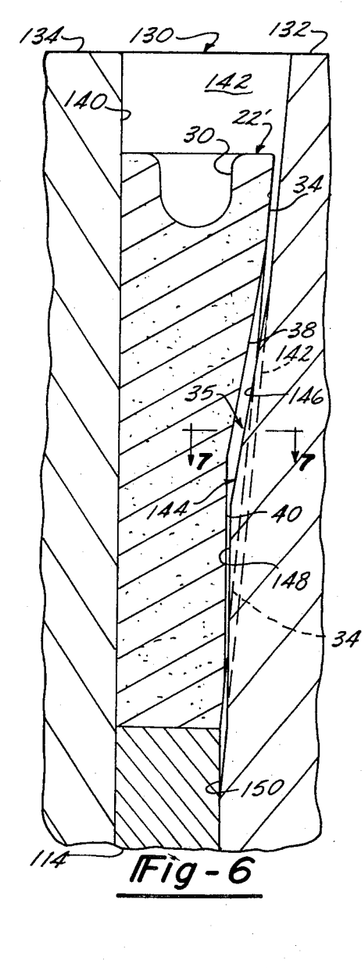

As best seen in FIGS. 4–7, a plurality of axially and radially inwardly extending equally circumferentially spaced ribs are provided on surface 142 which serve as cores 144 for molding grooves 36 in the outer periphery of compact 22', and hence, drum ring 22. The bottom surfaces 38 and 40 of grooves 36 are formed by the radially innermost surfaces 146 and 148 respectively of cores 144. Surfaces 146 and 148 are both inclined with respect to surface 140 of insert 134 so that they diverge from surface 140 in the direction in which a compact 22' is ejected from mold cavity 130. However, surface 148 of each core 144 is inclined at a smaller angle than surface 142, whereas surface 146 of each core 144 is inclined at a greater angle than surface 142 so that each core has a shallow V-shape as seen in FIGS. 4–6. Insert 132 has a cylindrical inner surface 150 extending below surface 142 and concentric with cylindrical surface 140 of inner insert 134 to define, in cooperation with surface 140, an annular opening for slidably receiving ejector sleeve 114 which in turn provides a movable seal filling this opening at the bottom of mold cavity 130 to prevent escape of iron powder 130. When apparatus 50 is fully closed (FIGS. 2 and 4) to compact a compact 22' in mold cavity 130 there is a space 152 between insert 132 and punch ring 56 above its lower outer edge 154 due to the inclination of surface 142 of the mold cavity. Preferably a slight clearance is provided between surface 142 and lower outer edge 154 of punch ring 56 when compacting apparatus 50 is fully closed to decrease the wear on the punch ring and this surface. Although this slight clearance results in an imperfect seal which allows some powdered metal 131 to escape past punch ring 56 into space 152 during downward movement of punch 56 to its closed position of FIG. 4, which in turn slightly decreases the density of powdered metal 131 in this area of compact 22', it has been found that this zone of lower density can be readily tolerated since it is on the radially outermost peripheral edge at the free end of the resulting brake drum 22.

In using apparatus 50, the press on which dies 52 and 54 are mounted in cycled to open dies 52 and 54, and then mold cavity 130 is filled with a mixture of powdered metal 131 such as powdered iron. The mixture of powdered metal 131 can be poured into cavity 130 with an excess of powdered metal spilling onto the upper surface of rings 30 and 82. The excess powdered metal can be removed and the powdered metal in mold cavity 130 leveled flush with the top of carrier rings 80 and 82 (as shown in FIG. 1) by wiping a strike-off bar (not shown) or other member with a flat surface across the tops of rings 80 and 82. The press is then actuated to move upper die 52 toward lower die 54 to close the dies. Initial closing movement of upper die 52 urges felt seal 64 into engagement with the top surface of insert 132 to prevent powdered metal 131 from escaping radially outwardly from the upper end of mold cavity 130. As the dies continue to close, punch ring 56 is extended into mold cavity 130 which moves insert 132 and carrier ring 80 axially downwardly. During this downward movement of ring 80, ejector sleeve 114 remains stationary and thus enters into mold cavity 130 to further compact the mixture of powdered metal 131. When upper and lower dies 52 and 54 are fully closed, ring 80 rests on its seat ring 110 as shown in FIG. 2, and both punch ring 56 and ejector sleeve 114 are extended into mold cavity 130 to fully compact powdered metal 131 to produce a compact 22'.

It is to be noted that as upper and lower dies 52 and 54 close, rings 80 and 82 and their associated mold inserts 132, 134 are free to float downwardly against their associated yieldably biased support pins 102 and 104. Thus, the position which inner carrier ring 82 and mold insert 134 assumes when upper and lower dies 52 and 54 are fully closed may vary slightly with each compact 22' formed in mold cavity 130. This free floating of inserts 132 and 134 decreases the variations in the density of powdered metal 131 in compact 22' compacted in mold cavity 130 and also tends to decrease the amount of force that must be applied to apparatus 50 to produce a satisfactory drum ring compact in mold cavity 130.

The press is then cycled to retract upper die 52 which opens the dies and withdraws punch ring 56 from mold cavity 130. Next, ejector pins 126 are extended to move sleeve 114 generally axially upwardly through mold cavity 130 to eject compact 22' which allows carrier rings 80, 82 and their associated cavity inserts 132, 134 to return upwardly to their extended positions as shown in FIG. 3. When fully ejected, the drum ring compact 22' is supported on sleeve 114 clear of rings 80 and 82 and can be readily removed from between the open upper and lower dies 52 and 54 for sintering and further processing.

Figure 7:
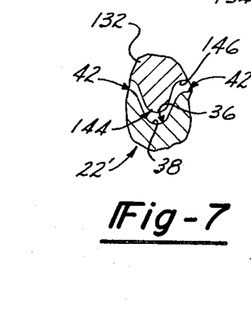
FIG. 7 is a fragmentary sectional view on line VII—VII of FIG. 6 illustrating the clearance between the brake drum ring compact and the outer side wall of the mold cavity when the compact is partially ejected.

In accordance with one important feature of the invention, as best seen in FIGS. 6 and 7, when compact 22' begins to be ejected from mold cavity 130, it immediately disengages from the molding surfaces 142, 146 and 148 of outer cavity insert 132 due to the particular trapezoidal cross section of the mold cavity and because these surfaces are all inclined outwardly from the axis of the compact 22' so as to diverge from mold surfaces 140 in the direction in which compact 22' is ejected from mold cavity 130. As the outer periphery of compact 22' becomes disengaged or released, the internal stresses imparted to the compact during compacting cause it to grow or expand circumferentially thereby enlarging the inside diameter of its inside surface 32. This increase in internal diameter in turn, separates and frees inside surface 32 of compact 22' from mold surface 140. Therefore, only a slight axial displacement of compact 22' is required to release and disengage it from the side walls of mold cavity 130. The result is a significant reduction in and in many applications virtual elimination of any scarring and the development of cracks and discontinuities in the inner and outer peripheries of the compact hitherto experienced during ejection from parallel wall mold cavities.

Another feature contributing to th above result is the free floating of inner cavity insert 134 which will move axially upwardly with compact 22' while the outer periphery thereof disengages from outer cavity insert 132. Hence, there is no relative movement between compact 22' and inner cavity insert 134 before the compact can grow or expand circumferentially. Elimination of this relative movement prior to disengagement of the compact from mold surface 140 assures that there will be no scarring of or cracks and discontinuuties in the critical inner peripheral brake track surface 32 of compact 22'.

The angle of inclination of surface 142 of mold cavity 130 to inner surface 140 thereof (and hence the angle of inclination of outer peripheral surface 34 of drum ring compact 22' to inner peripheral surface 32 thereof) should be at least about 1 degree and preferably in the range of 2 to 15 degrees. Such an angle of inclination of about 7 degrees is believed to be satisfactory. Similarly, the angle of inclination of the radially innermost surfaces 146 and 148 of cores 144 of mold cavity 130 to inner surface 140 thereof (and hence of bottom surfaces 38 and 40 of grooves 42 of drum ring compact 22' to inner peripheral surface 32 thereof) should be at least about 2 degrees and preferably in the range of 3 to 45 degrees for surface 146 and 1 to 14 degrees for surface 148. Angles of inclination of 10 and 4 degrees for bottom surfaces 38 and 40 respectively of grooves 42 of drum ring compact 22' are believed to be satisfactory.

One example of a drum ring compact 22' of powdered iron produced by the method and apparatus for this invention and sintered and fixed to a backing plate to make a satisfactory sintered brake drum embodying this invention has been made with the following dimensions:

| | |
|---|---|
| Inside diameter of surface 32 | 9 inches |
| Axial width from free end surface 160 to back end surface 162 | 3 inches |
| Inclination of outer surface 34 to inner surface 32 | 7° |
| Minimum diameter of outer surface 34 | 9.75 inches |
| Maximum depth of grooves 36 forming cooling fins 35 in outer periphery | 0.38 inch |
| Angle of inclination of bottom surfaces 38 and 40 of grooves 36 forming cooling fins to inner peripheral surfaces 32 | |
| surface 38 | 10° |
| surface 40 | 4° |
| Included angle of side walls of cooling fins 35 | 36° |
| Approximate thickness of cooling fins 35 at median depth | 0.06 inch |
| Number of equally spaced cooling fins 35 on outer periphery | 360 |

As this drum ring compact 22' is released from the mold cavity its inside diameter grows or expands approximately 0.020 of an inch.

From the foregoing description it will now be apparent that the method and apparatus of this invention in cooperation with the brake drum of this invention greatly decreases the tendency of the compact to be scarred and develop cracks and discontinuities as it is ejected from the mold, and hence, after the compact has been sintered, provides a stronger and more durable brake drum ring. The number of unacceptable compacts produced by the mold apparatus is also reduced, and hence, this saving in scrap loss results in a more economical manufacture of sintered brake drum rings of improved quality. The quick release and floating die features of the invention also produce a highly satisfactory inner peripheral brake track surface on the resulting brake drum ring which reduces or eliminates any machining or finishing of this surface, thereby further decreasing the cost of manufacture of the brake drum ring and the brake drum assembly in which it is utilized. Due to the decrease in the amount of force required to eject the drum ring compact from the mold cavity, design of the compacting apparatus is facilitated, its cost reduced, service or die life increased. In addition, the compacting apparatus can be operated satisfactorily with a smaller capacity press, and thus one which is less expensive to acquire, operate and service.

The frustoconical shape of the brake drum ring 22 produced from compact 22' with the thicker portion of the drum ring at its free end and tapering to the thinner portion which is fixed to a backing plate, provides a brake drum assembly which is reinforced to decrease bell mouthing of the brake drum when in use while decreasing the amount of powdered metal used to make the brake drum. In other words, the increased section modulus at the free end of the drum ring provides greater resistance to the radially outward thrust of the brake shoes than the thinner portion adjacent the backing plate 24. However, since the thin end is reinforced by plate 24, the entire axial width of the brake drum assembly provides a substantially uniform resistance to the radial thrust of the brake shoes and thus does not become bell mouthed or flared radially outwardly adjacent its free end.

It is also to be noted that the radially outermost portion or peak or each fin 35 extends, as best seen in FIG. 11, in a straight line flush with the two smooth marginal outer peripheral surfaces 164 and 166 which are located adjacent the free end 160 and fixed end 162 respectively of compact 22' or ring 22. The bottom surfaces 38 and 40 of grooves 36 are inclined at equal angles relative to the peak of each fin 35 and this angle is relatively small being on the order of five degrees. Although the fins may be rounded at their peaks, it is preferred that the groove bottom surfaces 38 and 40 be generally flat and tapered toward the center of the associated groove, the wider ends of surfaces 38 and 40 merging with the associated marginal surfaces 164 and 166 respectively. With this configuration of fins 35 and grooves 36, there is less likelihood of the fins being broken or chipped in use or handling even though they are made to very fine dimensions. Also, the flush characteristic of the ribs and adjacent smooth surfaces 164 and 166 insures uniform disengagement of compact 22' from the outer wall of the mold cavity during initial movement of the compact during the ejection stroke of the press. The inclination of groove surfaces 40 at an angle greater than zero degrees relative to the axis of the drum ring, permits ejection of the compact without portions 146 of the mold core or ribs 144 interfering with removal of the compact. It is to be understood that surfaces 38 and 40 could be one continuous curved surface so long as the aforementioned relationship is observed.

We claim:

1. Apparatus for making a brake drum ring compact having a cylindrical brake track by compacting powdered metal comprising, first and second generally opposed die means, said first die means having an annular mold cavity with radially spaced inner and outer peripheral walls, said inner wall being cylindrical in at least the portion of the mold cavity in which the powdered metal is compacted to form the compact and said outer wall being inclined to diverge with respect to said inner wall in the direction in which the compact is ejected from said mold cavity in at least the portion of said mold cavity in which the powdered metal is compacted to form the compact, said second die means comprising a generally annular punch adapted to be extended into said mold cavity when said first and second die means are moved toward each other to apply force to and compact powdered metal received in said mold cavity to form a brake drum ring compact therein, and a generally circular ejector means received in the narrower end of said mold cavity and adapted to be extended and retracted generally axially through said mold cavity relative to both said inner and outer walls thereof to eject therefrom a brake drum ring compact formed therein, said cylindrical portion of said inner wall being movably carried by said first die means for movement relative to the inclined outer wall portion generally axially in the direction of movement of the compact as the compact is initially ejected from said mold cavity by said ejector means.

2. The apparatus of claim 1 which also comprises means mounting said inner and outer walls of said mold cavity with respect to said first die means so that said walls can be shifted generally axially within predetermined limits with respect to each other and said first die means when said second die means is moved toward said first die means to move said punch into said mold cavity to compact powdered metal received therein to form a brake drum ring compact.

3. The apparatus of claim 2 wherein said inner and outer walls of said mold cavity have juxtaposed parallel cylindrical portions adapted to slidably receive said ejector means therebetween with a close fit whereby said mold cavity is sealed at its lower end by said ejector means when positioned to eject from said cavity a brake drum ring compact formed therein.

4. The apparatus of claim 1 which also comprises sealing means having a seal encircling said punch and carried by said second die means for generally axial movement with respect to said punch such that as said second die means is moved toward said first die means said seal engages said first die means to enclose and seal said mold cavity prior to and during entry of said punch into said mold cavity to prevent powdered metal therein from escaping exteriorly of said first die means.

5. The apparatus of claim 1 wherein said outer wall has thereon a plurality of circumferentially spaced ribs each extending generally axially and radially inwardly of said outer wall, each of said ribs sloping away from the inner wall generally in the same dirction as said outer wall.

6. The apparatus of claim 5 wherein each of said ribs has a pair of generally axially extending walls inclined generally radially inwardly away from said outer wall and toward each other.

7. The apparatus of claim 5 wherein each of said ribs has a generally shallow V-shaped cross section taken axially of said outer wall.

8. The apparatus of claim 1 wherein said outer wall is axially inclined in said first die means to extend radially outwardly from the point at which the radially outermost lower pierpheral edge of said punch extends into said mold cavity in the fully closed condition of said die means, said punch edge and said outer wall having a slight clearance when said first and second die means are fully closed.

9. The apparatus of claim 1 wherein said inner and outer walls of said mold cavity have juxtaposed parallel cylindrical portions adapted to slidably receive said ejector means therebetween with a close fit whereby said mold cavity is sealed at its lower end by said ejector means when positioned to eject from said cavity a brake drum ring compact formed therein.

* * * * *